United States Patent Office 3,133,400
Patented May 19, 1964

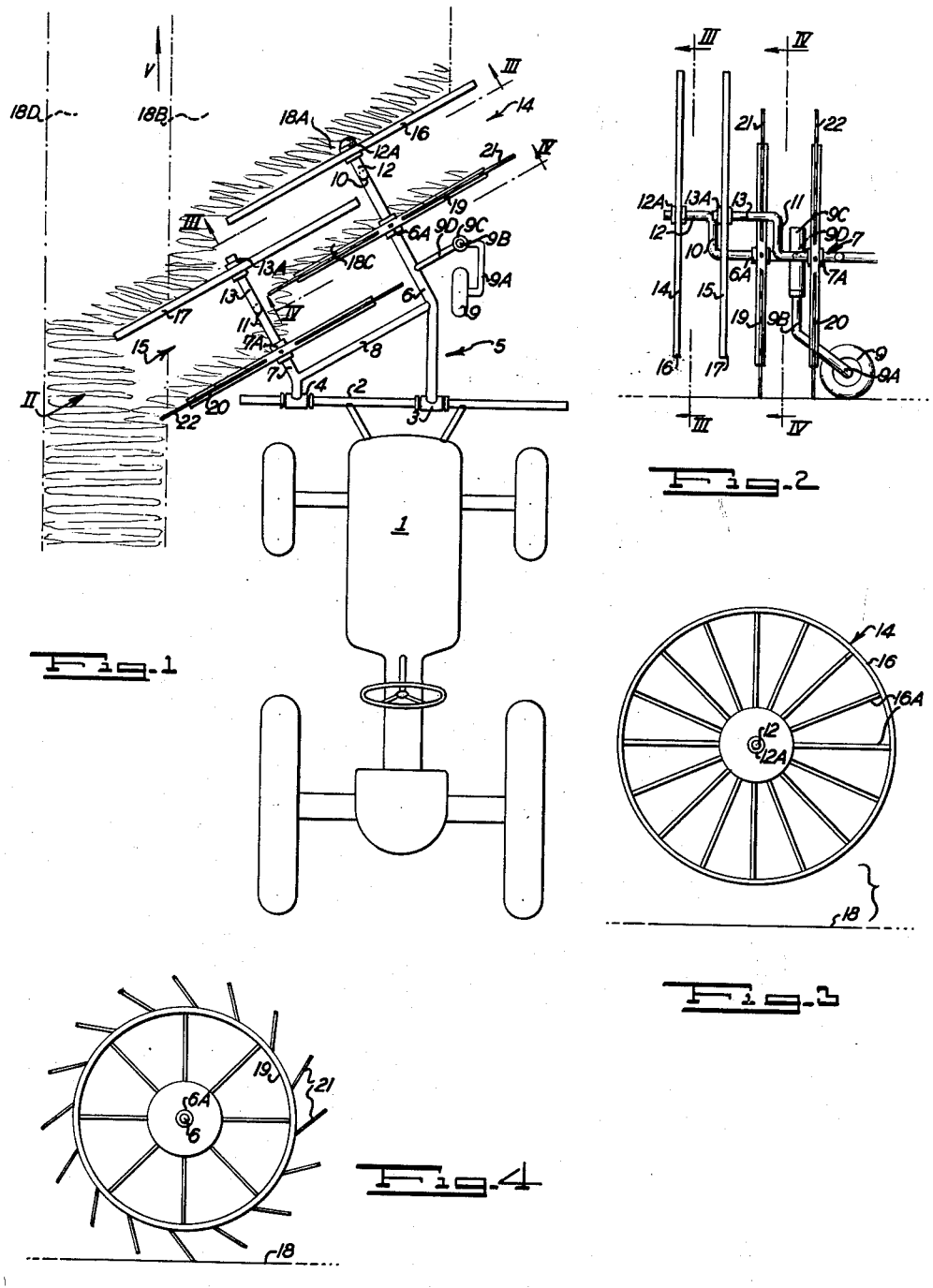

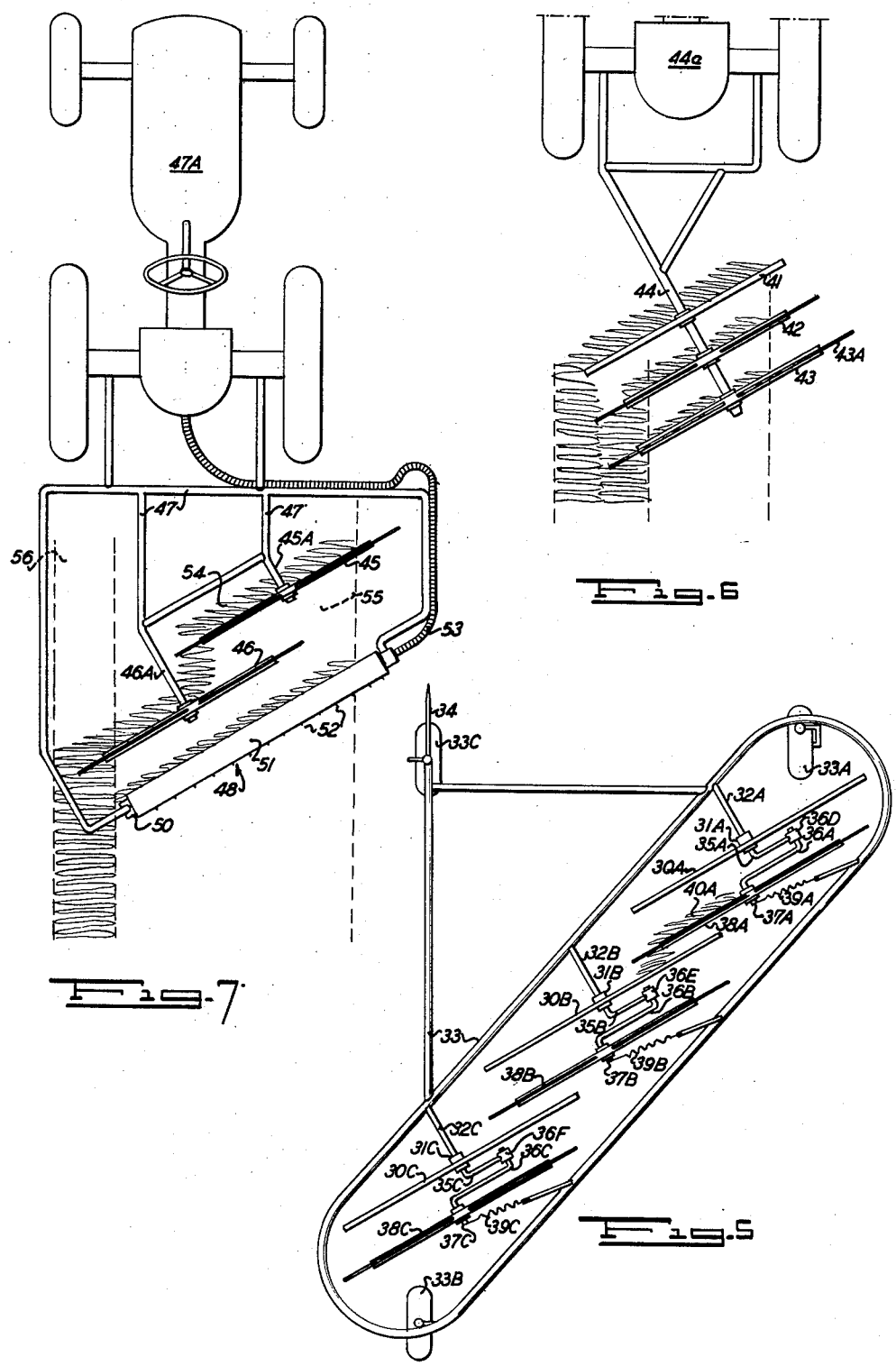

3,133,400
SIDE DELIVERY MEMBER HAVING A ROTARY GUIDING MEMBER COMBINED WITH A RAKING DEVICE
Cornelis van der Lely and Ary van der Lely, Maasland, Netherlands, assignors to C. van der Lely N.V., Maasland, Netherlands
Filed June 6, 1961, Ser. No. 115,151
19 Claims. (Cl. 56—377)

This invention relates to devices for laterally displacing grass, hay or like material lying on the ground and of the type including at least one rotatable side delivery member arranged on a mobile frame. This application is a continuation in part of applicants' application Serial Number 388,852, now abandoned.

In known devices of the above mentioned kind, the side delivery members are constituted by rake wheels the teeth of which move over or in close proximity above the ground, so that, in the case of uneven terrain, difficulties are encountered which can be only partially overcome by a resilient mounting of the rake wheels. As a matter of fact, the rake wheels have to perform a double function. In the first place, they have to accomplish the lateral transport of a large quantity of material, for which a rigid and solid construction of the rake wheel is most suitable, and in the second place the rake wheels have to satisfy the requirement that they leave the terrain worked by them as clean as possible, without appreciably damaging said terrain and more specifically the turf. This second requirement, which is contradictory to the first one, calls for a very flexible construction of the circumferential part and the raking elements of the rake wheel coming into contact with the ground.

It is an object of the present invention to provide a raking device in which at least one side delivery member includes a rotary guiding member combined with a raking member arranged therebehind, so as to divide both functions mentioned hereinbefore between separate members. The rotary guiding member has only to perform the first function, i.e., to take care of the lateral transport of the greater part of the crop lying upon the ground in front of said member. This rotary guiding member is located at an appreciable elevation and has its periphery free from the ground, so that it may be constructed without any difficulty as rigid as necessary to satisfy this condition. The greater part of the material on the ground is carried by this rotary guiding member in a lateral direction, since that part of said material which lies under the active periphery of said member is also carried along by the movement of the material situated at a higher elevation. The raking member located behind the rotary guiding member can now fully carry out the second function consisting in leaving the worked area of the terrain as clean as possible and without damage. Said raking device has only to work up a small quantity of material and may be made, therefore, so flexible and resilient that damage to the turf will be avoided.

Due to the fact that the rotary guiding member has only to take care of the transport of large quantities of material, the device according to the invention presents the special advantage that, when a plurality of these members are provided, the distance between the axles of said members may be greater than in known rake wheel arrangements, which generally have to overlap each other to a considerable extent.

Moreover, the construction according to the invention affords the possibility of connecting the axle of the rotary guiding member or, if there are a plurality of rotary guiding members, connecting all axles thereof rigidly to the frame. Thus, individual resilient mounting means for the rotary guiding member are not necessary, which leads to a considerable saving of weight and costs. For the raking device, a resilient mounting may be desirable, but since this device can be much lighter in weight, this will involve much lower costs and less additional weight. However, in many cases the raking device may be provided in such a manner that a resilient mounting thereof can be dispensed with as well. Since the rotary guiding members do not come into touch with the ground, but only with the crop lying thereupon, their periphery need not be provided with teeth or like elements dragging over the ground. The presence on the rotary guiding member of means such as a rim provided with spokes may be sufficient to cause rotation of said member during lateral displacement of the material, so that special driving means for the member will be superfluous. However, where the axis of rotation of the rotary guiding member coincides with the travelling direction or forms a small angle therewith, the member may be driven separately, for example, from a running wheel attached to the frame. The energy required for such driving will be very small, since the member does not carry teeth raking the ground.

Further objects, characteristic features, advantages and details of the present invention will appear from the following description with reference to the accompanying drawings in which some embodiments of the invention have been diagrammatically shown by way of example and in which:

FIG. 1 shows a plan view of a side delivery rake mounted in front of a tractor;

FIG. 2 is a side elevation of the rake of FIG. 1 viewed in the direction of the arrow II on FIG. 1;

FIG. 3 shows an elevation of a rotary guiding member of the device as viewed along the line III—III in FIGS. 1 and 2;

FIG. 4 shows an elevation of a raking member of the device as viewed along the lines IV—IV in FIGS. 1 and 2; and FIGS. 5, 6 and 7 are plan views of three other embodiments of the invention.

Referring to FIG. 1 of the drawings, a tractor 1 is provided, at its front, with a horizontal beam 2. By means of two cylindrical bearings 3 and 4 embracing the beam 2, a frame 5 is hingedly connected to the beam 2. The frame 5 is substantially composed of a bar 6, the rear end of which is provided with the bearing 3, and a bar 7, the rear end of which is provided with the bearing 4. The forward portions of the bars 6 and 7 extend obliquely. The bars 6 and 7 are connected together by a coupling rod 8, the bar 6 being supported near the connection with the rod 8 by means of a self-adjusting or swivel wheel 9. The horizontal axle 9A of the swivel wheel 9 is rigidly connected to a vertical axle 9B which is rotatable in a cylinder 9C, the latter being rigidly connected to the bar 6 by an arm 9D. The construction of the swivel wheel is also shown in FIG. 2.

The substantially horizontal bars 6 and 7, respectively, carry at their foremost ends vertical arms 10 and 11, merging into horizontal axles 12 and 13, respectively, upon which are supported side delivery members 14 and 15. The side delivery devices 14, 15 respectively comprise rotary guiding members 16, 17 and rake wheels 19, 20. The rotary guiding members are constituted by rims connected to respective hubs 12a and 13a by means of spokes, such as the spokes 16A shown in FIG. 3. As appears from FIG. 2, the axles 12 and 13, respectively, are located at an elevation above the ground 18, which is greater than the distance between the rim of the rotary guiding members 16 or 17 and the corresponding axle 12 or 13. Consequently, the active outer peripheries of the rotary guiding members 16 and 17 of the side delivery devices 14 and 15 are located at an appreciable elevation above the ground 18.

Behind the arms 10 and 11, the bars 6 and 7 are formed as axles carrying the hubs 6A and 7A of rake wheels 19 and 20, respectively. The running wheel 9 sustains the frame 5 in such a manner that the oblique teeth 21 and 22, on the rake wheels 19 and 20 respectively, contact the ground 18 and with slight pressure thereon as shown in FIG. 4. This pressure may be made very small by making the teeth 21 and 22, which cannot be subjected to a considerable pressure of the material to be laterally discharged, very supple or flexible.

The side delivery rake described above operates as follows: The rotary guiding members 16 and 17, which are free from contact with the ground 18 move in the normal direction V of travel of the tractor 1, and initially encounter hay 18A or other like material. The hay 18A will slip along the rotary guiding members 16 and 17 in an oblique direction and for the greater part the hay will be displaced to the left side of the tractor 1 as seen in FIG. 1. The oblique movement of the hay along the rotary guiding members 16 and 17 is highly facilitated by their ability to rotate about axles 12 and 13 respectively.

On the strip 18B of ground over which the rotary guiding members 16 and 17 have moved, some hay 18C will be left. However, the rake wheels 19 and 20, the teeth 21 and 22 of which touch the ground 18 and which, therefore, have a slow rotating movement, will rake the hay 18C from the strip 18B and into a strip 18D to the left of the tractor 1. Moreover, since the tines 21 and 22 are very supple, practically all the hay will be removed from the strip 18B.

The device shown in FIG. 5 comprises a number of rotatable guiding members 30A, 30B and 30C, the hubs 31A, 31B and 31C of which are adapted to rotate about axles 32A, 32B, 32C, respectively, secured to a frame 33, which is supported by a caster wheel 33A, a fixed running wheel 33B and a traction wheel 33C, to the axle of which is connected a hook 34. The device can be moved over the ground by traction applied to the hook 34, for example, by means of a horse. The extensions of the axles 32A, 32B and 32C carry arms 35A, 35B and 35C, respectively, upon which cranks 36A, 36B and 36C are rotatably mounted in bearings 36D, 36E and 36F. Upon the crank pins 37A, 37B and 37C of said cranks 36A, 36B and 36C, are rotatably supported rake wheels 38A, 38B and 38C. The wheels 33A, 33B and 33C support the frame 33 at such an elevation above the ground that the peripheries of the rotatable guiding members 30A, 30B and 30C will be amply free from the ground, the arrangement for each member being similar to that shown in FIG. 3 for the first described rotary guiding member. However, the rake wheels 38A, 38B and 38C rest with pressure upon the ground. The total pressure may be less, however, than the weight of the side delivery devices, the remainder of the weight being carried by springs 39A, 39B and 39C provided between the cranks 36A, 36B, 36C, respectively, and the frame 33.

Though the operation of the embodiment shown in FIG. 5 is much like that of the construction shown in FIGS. 1–4, it is important to note, in the construction according to FIG. 5, the material 40A gathered by the rake wheel 38A is not passed to the rake wheel 38B, but rather to the rotary guiding member 30B. Due to this construction, the rake wheel 38B is in the same favorable condition as the rake wheel 38A. The greater the number of rotary guiding members, each having a rake wheel therebehind, the greater is the advantage obtained thereby. If, in the case of FIG. 5, each of the rake wheels delivered material to the next rake wheel directly, the last of said rake wheels, e.g. the wheel 38C, could be easily overloaded.

As shown in FIG. 6, a rotary guiding member 41 and rake wheels 42 and 43, located therebehind, may be mounted upon a single straight axle 44 rigidly secured to a tractor 44A. The rake wheels 42 and 43, are each individually rotatable about the axle 44. The member 43 has a diameter which is larger than that of the rotary guiding member 41 such that, although the member 41 is amply free from the ground, the teeth 43A of the rake wheel 43 will touch the ground. The wheel 42 substantially corresponds to the wheel 43, but has a diameter between that of the member 41 and that of wheel 43. By using two rake wheels 42 and 43, an advantage is obtained in that the wheel 43 will be only subjected to a very small charge and may be formed, therefore, so that it is extremely supple and flexible, whereby the terrain worked will be left entirely clean and absolutely undamaged.

It is not necessary to locate a separate rake wheel behind each rotary guiding member. In the embodiment shown in FIG. 7, behind the raking members 45 and 46, which are rotatably mounted on axles 45A and 46A, there is provided a rake device comprising a rotary brush 48 extending in a horizontal direction transversely to the axes of rotation 45A and 46A of the members 45 and 46 substantially throughout the whole working width of the latter members. The brush 48 is mounted in bearings 49 and 50 secured to the frame 47.

The brush 48 comprises a cylinder 51 covered with resilient extensions 52 in contact with the ground, said cylinder being driven in such a manner that the extensions 52 will move in a forward direction on the lower side of the cylinder. The power for the cylinder drive is derived from the motor of the tractor by transmission means 53.

In use, the raking members 45 and 46 are amply free from the ground and hay 54, encountered by the member 45, is fed to the member 46 and is, together with other hay from a strip of ground 55, transported to a strip of ground 56 by the member 46. The members 45 and 46 leave only a small amount of hay on the strip of ground 47. This hay is also transported to the strip 56 by the rotating brush 48. Therefore, the strip 55 will be cleaned perfectly and no hay will be left thereon.

What is claimed is:

1. A side delivery raking device for laterally displacing material lying on a first strip of ground to a second strip of ground at one side of the first strip; said device comprising a frame supported for traveling the ground in a normal direction of travel, at least one side delivery member supported from said frame, said member including a rotary guiding member and a raking member behind the rotary guiding member, said rotary guiding member having an outer periphery and being mounted on said frame so that the normal distance of the axis of said member above the ground is substantially greater than the radial distance from said axis to the outer periphery of said rotary guiding member, said raking member being arranged on said frame behind said rotary guiding member with respect to the normal direction of travel of said frame over the ground, and teeth on said raking member defining an active outer periphery, the active outer periphery of said raking member being disposed closer to the ground than said outer periphery of said rotary guiding member and being located on said frame so that the strip of ground acted upon by said raking member substantially coincides with the strip of ground acted upon by said rotary guiding member, said raking member having a greater flexibility than said guiding member, said raking and guiding members being disposed obliquely to said direction.

2. A device according to claim 1; wherein said raking member has a substantially circular periphery with teeth extending therefrom to contact that ground and thereby to cause rotation of the raking member.

3. A device according to claim 1; wherein the axis of rotation of said rotary guiding member is rigidly fixed with respect to said frame.

4. A device according to claim 1; comprising a second side delivery member spaced from the first said side delivery member in the direction of travel of said frame said second side delivery member including a rotary guiding and a related raking member therebehind, said rotary guiding member of the second side delivery member being arranged behind the other side delivery member for receiving the material delivered by the raking member associated with said preceding side delivery member.

5. A device according to claim 1; wherein the radius of the active outer periphery of said raking member is substantially equal to said distance above the ground of said axis of the rotary guiding member whereby the outer periphery of said raking member is in contact with the ground and the axis of rotation of said raking member is in alignment with said axis of the rotary guiding member disposed thereinfront and arranged to act upon the same strip of ground.

6. A device according to claim 1; further comprising means mounting said raking member on said frame to permit substantially vertical movement of the raking member relative to said frame so that said raking member can be vertically displaced as the frame travels over uneven terrain to avoid damage to the latter.

7. A device according to claim 6; wherein said mounting means includes a crank arm rockably connected to said frame and supporting the related raking member thereon for rotation.

8. A side delivery rake having a normal direction of travel comprising a mobile frame, at least one rotary guiding member rotatably mounted on said frame, said rotary guiding member having an outer periphery, said rotary guiding member being supported on said frame at a level which leaves the periphery of the guiding member substantially spaced from the ground, at least one raking member on said frame and fixedly spaced rearwardly of said rotary guiding member, and means operatively associated with the raking member to support the same in contact with the ground, said rotary guiding member and raking member being aligned along and disposed obliquely to said direction of travel, said raking member having a greater flexibility than said rotary guiding member.

9. A side delivery rake according to claim 8 wherein a vertical plane through the axis of rotation of the rotary guiding member passes through the raking member.

10. A side delivery rake according to claim 9 wherein the raking member is a rotatable rake wheel and defines an axis of rotation coinciding with the axis of the rotary guiding member.

11. A side delivery rake according to claim 10 wherein the rotary guiding member includes peripheral tines and the raking member comprises tines the free ends of which extend further from the axes than the free ends of the tines on the rotary guiding member.

12. A side delivery rake according to claim 8 wherein said rotary guiding member and said raking member each include peripheral tines the free ends of the tines on the raking member being flexible and resilient so as to yield more easily under the action of material to be raked than the rotary guiding member.

13. A side delivery rake according to claim 8 wherein said rotary guiding member is a wheel the outer periphery of which is a rim and the raking member is a raking wheel including outer peripheral tines, the circumferential circle of the free ends of the tines having a greater diameter than the rim of said rotary guiding member.

14. A side delivery rake having a normal direction of travel comprising a mobile frame, a rotatable rotary guiding member operatively associated with said frame for the lateral displacement of material lying on the ground, a rotatable raking member behind said rotary guiding member and operatively associated therewith for cooperatively laterally displacing material lying on a strip on the ground, and a plurality of tines mounted solely on said raking member for cleaning the ground traversed by said frame and from which ground the major portion of the material has been displaced by said rotary guiding member, said raking member having a greater flexibility than said guiding member, said raking and guiding members being disposed obliquely to said direction.

15. A rake as claimed in claim 14 comprising a bar supporting the rotary guiding member and raking member with spaced axes of rotation.

16. A rake as claimed in claim 14 wherein said rotary guiding member and raking member are independently rotatable.

17. A rake as claimed in claim 14 wherein said mobile frame has a determinable direction of travel and said rotary guiding member and raking member are positioned at an acute angle relative to said direction.

18. A rake as claimed in claim 14 wherein said rotary guiding member and raking member are free wheeling elements.

19. A side delivery rake comprising a mobile frame, a plurality of rotatable rotary guiding members operatively supported from said frame in overlapping relation, a plurality of raking members in overlapping relation and operatively supported from said frame in correspondence with said rotary guiding members, said raking members being intermediate said rotary guiding members and said frame, and a plurality of tines on said raking members and defining thereupon an active outer periphery, said rotary guiding members and raking members being supported relative to said frame and one to another so that said periphery of said raking members extends downwardly to a greater extent than said rotary guiding members for cleaning the ground traversed, said raking members having a greater flexibility than said guiding members.

References Cited in the file of this patent

UNITED STATES PATENTS

| 2,472,260 | Morrill | June 7, 1949 |
| 2,670,588 | Plant | Mar. 2, 1954 |

FOREIGN PATENTS

| 68,100 | Austria | Mar. 10, 1915 |